P. Pennington,
Churn,
N° 79,773. Patented July 7, 1868.

Witnesses:

Inventor:
Philip Pennington
per Alexander Mason
Attys.

United States Patent Office.

PHILIP PENINGTON, OF UNION CITY, INDIANA.

Letters Patent No. 79,773, dated July 7, 1868.

IMPROVEMENT IN CHURNS.

The Schedule referred to in these Letters Patent and making part of the same.

TO ALL WHOM IT MAY CONCERN:

Be it known that I, PHILIP PENINGTON, of Union City, in the county of Randolph, and in the State of Indiana, have invented certain new and useful Improvements in Churns; and do hereby declare that the following is a full, clear, and exact description thereof, reference being had to the accompanying drawings, and to the letters of reference marked thereon.

The nature of my invention consists in providing a churn with two horizontal arms, which have upright staves, with horizontal semicircular dashers attached to them, and which revolve in opposite directions, and can be taken out and put in at pleasure.

To enable others skilled in the art to make and use my invention, I will proceed to describe its construction and operation.

Figure 1:
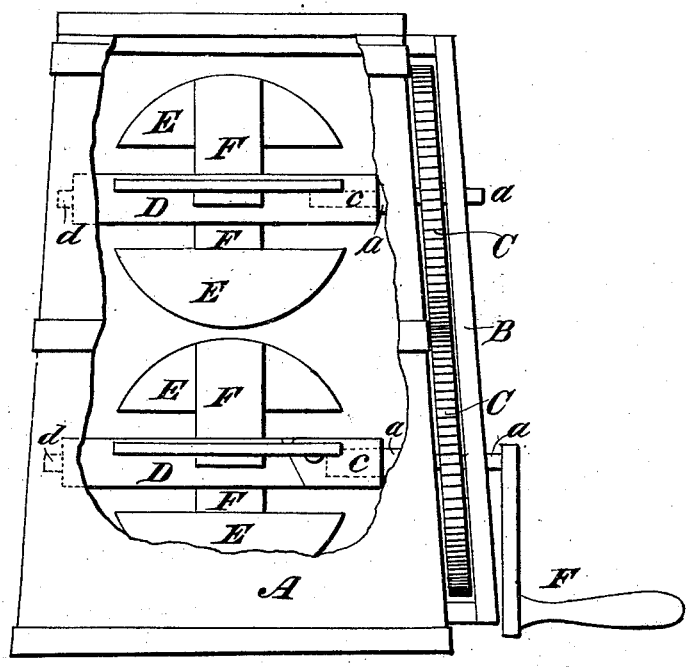
Figure 2:
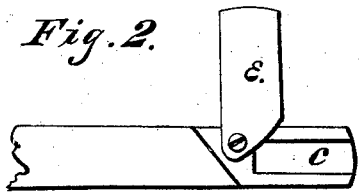

In the annexed drawings, forming part of this specification, A represents a tub or churn, which is provided with a standard or frame, B, on one side. Between this frame B and the churn A, two cogged wheels, C C, revolve on two journals, $a\ a$, which have their bearings in the frame and in the churn, and extend into the churn, where they fit into recesses or grooves, $c\ c$, on the arms D D. In the other end of these arms are journals $d\ d$, which have their bearings in the opposite side of the churn. The arms D D are provided with upright staves F F, which have semicircular dashers, E E, attached to them, which revolve with the arms, and make the butter. There may be as many staves and dashers as is desired. The arms D D are held secure on the ends of the journals $a\ a$ by means of a slide, $e$, which turns over the recess or groove $c$, as shown in Figure 2, so that, when the butter is made, and it is desired to remove the dashers, it is only necessary to open the slide $e$, when the arm D will slip off from the journal $a$, and the journal $d$ will come out from the side of the churn. The crank, F, turns one of the wheels, C, and the wheels C C work in each other, so that the arms D D, with their staves F F, and dashers E E, will revolve in opposite directions.

Having thus fully described my invention, what I claim as new, and desire to secure by Letters Patent, is—

The combination of the dashers E F on the movable arms D D, having recesses $c\ c$ and slides $e\ e$, for securing to the journals $d\ d$ in the churn A, to operate as set forth.

In testimony that I claim the foregoing, I have hereunto set my hand, this 4th day of May, 1868.

PHILIP PENINGTON.

Witnesses:
J. W. STUDY,
D. F. J. FERGUSON.